US009094896B2

(12) United States Patent
Amerga et al.

(10) Patent No.: US 9,094,896 B2
(45) Date of Patent: *Jul. 28, 2015

(54) METHOD AND APPARATUS FOR CELL BARRING IN A WIRELESS COMMUNICATION SYSTEM

(71) Applicant: QUALCOMM Incorporated, San Diego, CA (US)

(72) Inventors: Daniel Amerga, San Diego, CA (US); Nathan Edward Tenny, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 13/660,983

(22) Filed: Oct. 25, 2012

(65) Prior Publication Data

US 2013/0051366 A1    Feb. 28, 2013

Related U.S. Application Data

(63) Continuation of application No. 12/651,593, filed on Jan. 4, 2010, now Pat. No. 8,699,412.

(60) Provisional application No. 61/142,571, filed on Jan. 5, 2009.

(51) Int. Cl.
*H04W 4/00* (2009.01)
*H04W 48/16* (2009.01)
(Continued)

(52) U.S. Cl.
CPC .............. *H04W 48/16* (2013.01); *H04W 28/04* (2013.01); *H04W 48/20* (2013.01)

(58) Field of Classification Search
CPC ................... H04B 7/2628; H04B 2201/70701; H04B 2201/70702; H04B 2201/70718; H04B 7/2621; H04B 7/2643; H04B 7/2656; H04B 1/50; H04B 1/56; H04J 2011/0003; H04W 4/10; H04W 80/04; H04W 88/06; H04W 88/08; H04W 84/08; H04W 84/12; H04W 84/18; H04W 72/04; H04W 72/0446; H04W 72/0453; H04W 76/00; H04W 76/02; H04W 74/04; H04W 74/06; H04W 74/08

USPC ................... 370/328–330, 335–346; 455/422.1–424, 500, 63.1–63.2, 67.11, 455/67.13

See application file for complete search history.

(56) References Cited

U.S. PATENT DOCUMENTS 5,771,467 A *   6/1998  Sato .............................. 455/557
6,337,983 B1 *  1/2002  Bonta et al. ................... 455/437
(Continued)

FOREIGN PATENT DOCUMENTS

CN    1720698 A    1/2006
EP    1940080 A2   7/2008
(Continued)

OTHER PUBLICATIONS

"3rd Generation Partnership Project; Technical Specification Group Radio Access Network; Evolved Universal Terrestrial Radio Access (E-UTRA) Radio Resource Control (RRC); Protocol specification (Release 8)" 3GPP Standard; 3GPP TS 36.331, 3rd Generation Partnership Project (3GPP), Mobile Competence Centre; 650, Route Des Lucioles; F-06921 Sophia-Antipolis Cedex; France, No. V8.4.0, Dec. 1, 2008, pp. 1-198, XP050377647, paragraph [5.2.2.5] paragraph [6.2.2].

(Continued)

*Primary Examiner* — Thai Hoang
(74) *Attorney, Agent, or Firm* — Tyler J. Overall

(57) ABSTRACT

Systems and methodologies are described herein that facilitate cell barring based on erroneous messages received within a wireless communication system. As described herein, in the event that a device fails to receive and/or decode respective messages transmitted from a network cell over a common communication channel, the device can implement one or more error handling procedures as described herein to reselect away from the network cell and/or a frequency associated with the network cell (e.g., as if the network cell was explicitly barred). Cell barring can be triggered as described herein based on a count of erroneous messages (e.g., consecutive messages, messages received within a predetermined time window, etc.), elapsed time between erroneous messages, or the like. Further, cell barring can be performed as described herein based on failure to acquire pre-scheduled system information, common system information determined to have invalid abstract syntax, or the like.

25 Claims, 13 Drawing Sheets

(51) Int. Cl.
*H04W 28/04* (2009.01)
*H04W 48/20* (2009.01)

(56) References Cited

U.S. PATENT DOCUMENTS

| | | | |
|---|---|---|---|
| 6,442,152 B1* | 8/2002 | Park et al. | 370/341 |
| 8,699,412 B2* | 4/2014 | Amerga et al. | 370/328 |
| 8,767,881 B2* | 7/2014 | Yokokawa et al. | 375/324 |
| 2002/0176408 A1* | 11/2002 | Kangas | 370/352 |
| 2003/0059201 A1* | 3/2003 | Todo et al. | 386/46 |
| 2006/0156215 A1* | 7/2006 | Kapur et al. | 714/818 |
| 2007/0088974 A1* | 4/2007 | Chandwani et al. | 714/6 |
| 2007/0153724 A1* | 7/2007 | Cheon et al. | 370/328 |
| 2008/0127311 A1 | 5/2008 | Yasaki et al. | |
| 2008/0137632 A1 | 6/2008 | Choi et al. | |
| 2010/0172297 A1 | 7/2010 | Amerga et al. | |
| 2011/0299447 A1* | 12/2011 | Rudolf et al. | 370/311 |

FOREIGN PATENT DOCUMENTS

| | | | |
|---|---|---|---|
| JP | 7222245 A | 8/1995 | |
| JP | 2003516040 A | 5/2003 | |
| JP | 2005012605 A | 1/2005 | |
| WO | 0141394 A1 | 6/2001 | |
| WO | WO-2004051872 A2 | 6/2004 | |
| WO | 2006072978 A1 | 7/2006 | |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 8)" 3GPP Standard; 3GPP TS 36.304, 3rd Generation Partnership Project (3GPP), Mobile Competence Centre; 650, Route Des Lucioles; F-06921 Sophia-Antipolis Cedex; France, No. V8.4.0, Dec. 1, 2008, pp. 1-29, XP050377596 paragraph [05.2]—paragraph [05.3].

3rd Generation Partnership Project; Technical Specification Group Radio Access Network; Radio Resource Control (RRC) ; Protocol Specification (Release 8) 3GPP Standard; 3GPP TS 25.331, 3rd Generation Partnership Project (3GPP), Mobile Competence Centre ; 650, Route Des Lucioles ; F-06921 Sophia-Antipolis Cedex ; France, No. V8.5.0, Dec. 1, 2008, pp. 1-1646, XP050368025.
International Search Report—PCT/US2010/020146, International Search Authority—European Patent Office—May 6, 2010.

Rapporteur, Nokia Siemens Networks, "Report on Generic Error Handling email discussion", R2-085699, 3GPP TSG-RAN WG2 Meeting #63bis Prague, Czech Republic, Sep. 29-Oct. 3, 2008.
Taiwan Search Report—TW099100128—TIPO—Jan. 18, 2013.
Written Opinion—PCT/US2010/020146—ISA/EPO—May 6, 2010.

QUALCOMM EUROPE, "Error handling on common channels, redux" [online], 3GPP TSG-RAN WG264bis, R2-090114, 12-15 Jan 2009, <Url:http://www.3gpp.org/ftp/tsg_ran/WG2_RL2/TSGR2_64bis/Docs/R2-090114.zip>, 200901-06, pp. 1-4.

* cited by examiner

METHOD AND APPARATUS FOR CELL BARRING IN A WIRELESS COMMUNICATION SYSTEM

CROSS-REFERENCE

This application is a Continuation Application of U.S. Ser. No. 12/651,593; Filed Jan. 4, 2010, entitled "Method and Apparatus for Cell Barring in a Wireless Communication System," which claims the benefit of U.S. Provisional Application Ser. No. 61/142,571, filed Jan. 5, 2009, and entitled "Cell barring on erroneous messages," the entirety of which is incorporated herein by reference.

BACKGROUND

I. Field

The present disclosure relates generally to wireless communications, and more specifically to techniques for cell selection and error handling in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

Wireless communications can be conducted through a cellular communication network and/or another suitable communication environment through the exchange of messages between respective user equipment units (UEs) and network cells. In some cases, it can be appreciated that various factors can cause a UE to receive degraded service from a given network cell (e.g., in the form of malformed or absent messages). Some factors that can lead to UE service degradation can be transient in nature, while others can cause service disruptions of longer durations. Traditionally, UEs can be configured to avoid taking excessive precautionary action (e.g., avoiding a network cell) in response to errors encountered from a given network cell. However, such a UE configuration can in some cases result in a UE becoming "trapped" on a dysfunctional network cell. For example, in the event that a UE is instructed to ignore faulty messages from a network cell, the UE may become substantially unable to obtain service on its associated network in the case of extended degradation experienced from the network cell. Accordingly, it would be desirable to implement improved techniques for handling erroneous messages transmitted within a wireless communication system.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein. The method can comprise obtaining one or more messages from a designated network cell over a common channel; attempting decoding of the one or more messages; tracking respective errors encountered during the attempted decoding of the one or more messages; and initiating an avoidance procedure associated with barred network cells with respect to the designated network cell according to respective tracked errors associated with the attempted decoding of the one or more messages.

A second aspect described herein relates to a wireless communications apparatus, which can comprise a memory that stores data relating to a designated network cell and a common communication channel associated with the designated network cell. The wireless communications apparatus can further comprise a processor configured to obtain one or more messages from the designated network cell over the common communication channel, to attempt decoding of the one or more messages, to track respective errors encountered during attempted decoding of the one or more messages, and to initiate an avoidance procedure associated with barred network cells with respect to the designated network cell according to respective tracked errors encountered during the attempted decoding of the one or more messages.

A third aspect relates to an apparatus, which can comprise means for attempting acquisition of respective common messages from a network cell; means for tracking errors encountered during attempted acquisition of the respective common messages; and means for initiating reselection away from the network cell according to respective tracked errors encountered during attempted acquisition of the respective common messages.

A fourth aspect described herein relates to a computer program product, which can include a computer-readable medium that comprises code for causing a computer to attempt acquisition of respective common messages from a network cell; code for causing a computer to track errors encountered during attempted acquisition of the respective common messages; and code for causing a computer to initiate reselection away from the network cell according to respective tracked errors encountered during attempted acquisition of the respective common messages.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
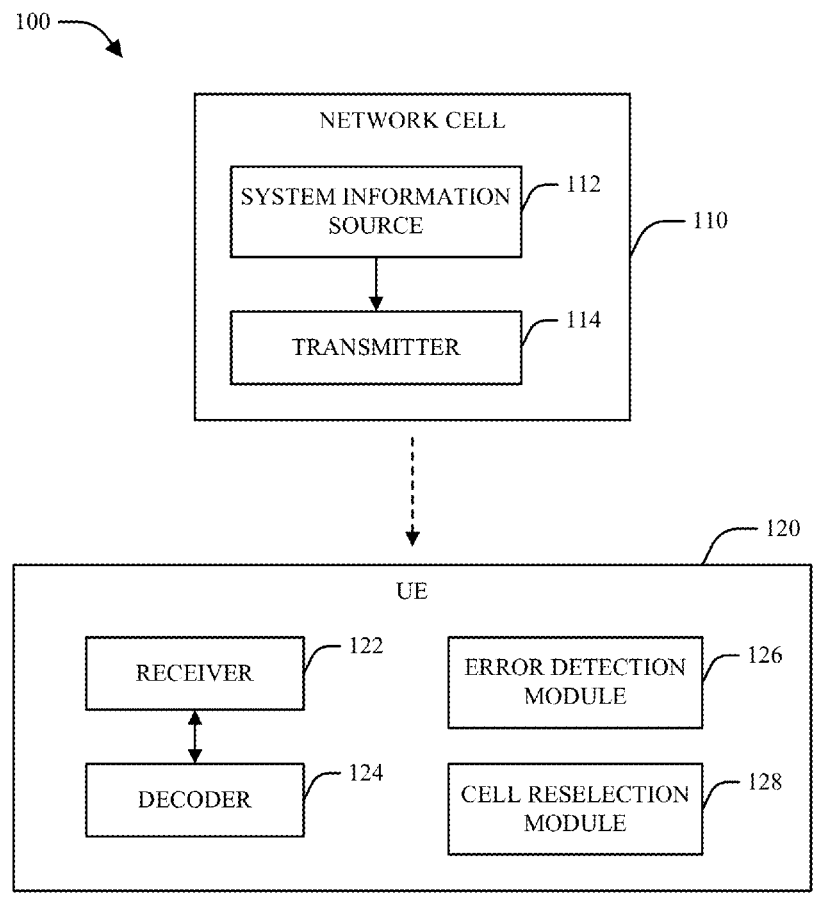
FIG. 1 is a block diagram of a system for implementing cell barring procedures upon identification of erroneous messages in a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards.

A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or omit some or all of the devices, components, modules etc. discussed in connection with the figures. A combination of these approaches can also be used.

Referring now to the drawings, FIG. 1 illustrates a system 100 for implementing cell barring procedures upon identification of erroneous messages in a wireless communication system in accordance with various aspects described herein. As FIG. 1 illustrates, system 100 can include one or more network cells (e.g., base stations, access points (APs), Node Bs or Evolved Node Bs (eNBs), etc.) 110, which can communicate with one or more user equipment units (UEs; also referred to herein as access terminals (ATs), mobile terminals, etc.) 120. For example, UE 120 can engage in one or more uplink (UL, also referred to as reverse link (RL)) communications with network cell 110, and network cell 110 can engage in one or more downlink (DL, also referred to as forward link (FL)) communications to UE 120. Additionally or alternatively, network cell 110 and/or UE 120 can engage in any suitable communication(s) with each other, with other network cells and/or UEs in system 100, and/or any other suitable network entities.

In accordance with one aspect, network cell 110, UE 120, and/or other entities in system 100 can operate according to a set of system information. In one example, network cell 110 can be associated with a system information source 112 and/or other means by which information relating to the operation of system 100 can be identified, generated, and/or otherwise obtained. System information can be, for example, generated locally at network cell 110, obtained from an external source (e.g., a Radio Network Controller (RNC) and/or other suitable means), or obtained in any other suitable manner.

As illustrated in system 100, system information associated with system information source 112 can be transmitted by network cell 110 via a transmitter 114. In accordance with one aspect, control information can be transmitted by network cell 110 in the form of one or more common messages and/or other suitable messages transmitted over a common channel (e.g., a Broadcast Control Channel (BCCH), Common Control Channel (CCCH), Paging Control Channel (PCCH), etc.). Alternatively, dedicated unicast signaling to respective UEs 120 and/or other suitable transmission techniques can be utilized. In one example, control messages transmitted by network cell 110 can be Radio Resource Control (RRC) messages and/or messages constructed according to any other suitable protocol(s).

As further shown in system 100, upon transmission of control signaling and/or other common messages by network cell 110, a UE 120 can utilize a receiver 122 and/or other suitable mechanisms to receive the respective signaling and/ or messages. In one example, upon receipt at UE 120, respective messages and/or other signaling can be passed to a decoder 124 for further processing.

In accordance with one aspect, wireless communications can be facilitated within system 100 via the exchange of messages between network cell 110 and UE 120. However, various factors associated with system 100 can cause respective messages associated with network cell 110 to be malformed (e.g., such that errors are encountered during decoding of the messages at decoder 124), omitted (e.g., such that errors are encountered during receipt of the messages at receiver 122), and/or otherwise erroneous. In one example, erroneous downlink messages from network cell 110 to UE 120 can be caused by transient factors, such as mobility of UE 120 through an area with obstacles that cause temporary disruption to communication service between network cell 110 and UE 120. Additionally or alternatively, other factors, such as a network cell 110 that is sending an ill-formed neighbor list, a network cell 110 that is unable to transmit a decodable message for bringing UE 120 into a connected state from idle state, or the like, can result in service disruptions of longer durations.

For transient errors that occur on a common channel, UE 120 can be configured to ignore system information blocks (SIBs) and/or other message elements that are determined by UE 120 to be erroneous. Such a configuration can be utilized by UE 120, for example, as a conservative error handling measure that can prevent the taking of unwarranted action, such as abandoning network cell 110, in cases where errors are transient and error-free service is expected to return in a relatively short period of time. However, it can be appreciated that for longer periods of service disruption from network cell 110 to UE 120, if UE 120 is programmed to simply ignore faulty messages provided by network cell 110 (e.g., and to take no further action), such an error handling strategy can result in UE 120 becoming "trapped" and/or otherwise unable to move away from the coverage of a dysfunctional network cell that is transmitting malformed messages. It can be appreciated that this, in turn, can lead to a long-term and substantial inability of UE 120 to obtain communication service within system 100.

Thus, in view of at least the foregoing, UE 120 can realize improved error handling performance via an error detection module 126, a cell reselection module 128, and/or other mechanisms, which can enable UE 120 to escape (e.g., initiate selection away from) a network cell that is determined unusable due to protocol problems on common channels. In accordance with one aspect, error detection module 126 can track respective errors encountered during attempted receipt and decoding (e.g., via receiver 122 and decoder 124, respectively) of one or more messages obtained over a common channel from network cell 110, and cell reselection module 128 can initiate one or more avoidance procedures associated with barred network cells with respect to network cell 110 according to respective errors tracked by error detection module 126. Accordingly, by enabling UE 120 to reselect a new cell in the event that network cell 110 is transmitting malformed messages, error detection module 126 and/or cell reselection module 128 can be utilized as a failsafe in error handling for UE 120 such that severe network error cases on a network cell that is determined to be the best cell for UE 120 do not force UE 120 to be stuck on the erroneous cell. Various specific examples of techniques by which error detection module 126 and cell reselection module 128 can operate are described in further detail below.

In accordance with one aspect, based on respective errors identified by error detection module 126 during receipt and/or decoding of respective messages on a common channel from network cell 110, cell reselection module 128 can implement one or more procedures by which network cell 110 is considered as barred for purposes of subsequent communication within system 100. Conventionally, cell barring can be invoked implicitly or explicitly for a given network cell in a wireless communication system. For example, in the case of special purpose cells (e.g., run by a network operator), cells on which maintenance is being performed, or the like, a cell can explicitly signal to respective users within range of the cell that the cell is barred. Upon receiving such signaling, respective users can undergo one or more procedures to select a non-barred cell (e.g., at a frequency different from that served by the barred cell(s)). Alternatively, in the event that a user determines that a cell is providing erroneous critical system information (e.g., corresponding to a Master Information Block (MIB) or the like) such that the user is unable to connect to the cell, the user can leave the coverage cell as if the cell was explicitly barred.

In accordance with another aspect, cell reselection module 128 can be utilized by UE 120 to consider network cell 110 to be barred in the case of erroneous system messages received from network cell 110 on a common channel, thereby improving the ability of UE 120 to obtain service within system 100 in the presence of network cells transmitting malformed messages and/or other erroneous information. Traditionally, it can be appreciated that if a UE obtains an undecodable message on a common channel (e.g., such that the format of the message is incorrect, the encoding of the message is erroneous, etc.), the UE is generally configured to simply ignore the message. However, it can be further appreciated that if a network cell is transmitting corrupt messages on common channels, such cell behavior can in some cases be indicative of significant errors associated with the network cell. Accordingly, in the presence of such errors, a UE 120 as described herein can be configured to ensure adequate performance by utilizing similar error handling behaviors to those generally applied for missing crucial system information to cases in which system information other than crucial system information is not received and/or erroneously received from network cell 110.

By way of specific example, a UE 120 can be configured to receive and decode information corresponding to a neighbor list transmitted by network cell 110. In the event that UE 120 determines that the neighbor list transmitted by network cell 110 is corrupt, it can be appreciated that UE 120 can in some cases be unable to obtain information relating to cells neighboring network cell 110, which in turn can negatively impact mobility of UE 120. Accordingly, in such a case, UE 120 can infer that network cell 110 is malfunctioning and initiate error handling procedures as if network cell 110 is barred.

As another specific example, respective common channels utilized for communication from network cell 110 to UE 120 can be configured such that respective messages transmitted by network cell 110 on the common channels are to be decodable by any entity, such as UE 120, that receives the messages. Accordingly, if UE 120 detects errors in decoding messages transmitted by network cell 110 on a common channel, UE 120 can infer that network cell 110 is experiencing a fundamental operating error, based on which UE 120 can avoid network cell 110 as if network cell 110 was explicitly barred.

In accordance with one aspect, upon detecting errors associated with network cell 110 sufficient to trigger operation of cell reselection module 128, cell reselection module 128 can initiate selection of a network cell that is disparate from network cell 110 at a frequency band disparate from a frequency band associated with network cell 110. In one example, such reselection can be performed in a similar manner to reselection operation(s) that are performed by UE 120 upon detecting that a network cell is explicitly barred. In another example, such reselection can be performed independently of present radio frequency (RF) conditions, standard mobility behaviors of UE 120, and/or other associated factors.

Figure 2:
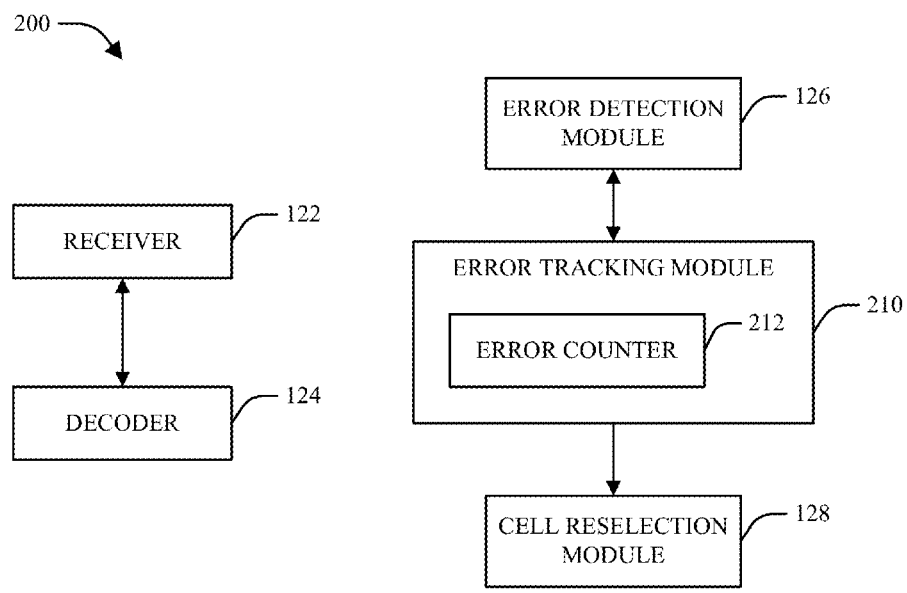
FIGS. 2-3 are block diagrams of respective systems for tracking message errors in connection with respective cell avoidance/reselection procedures in accordance with various aspects.
Figure 3:
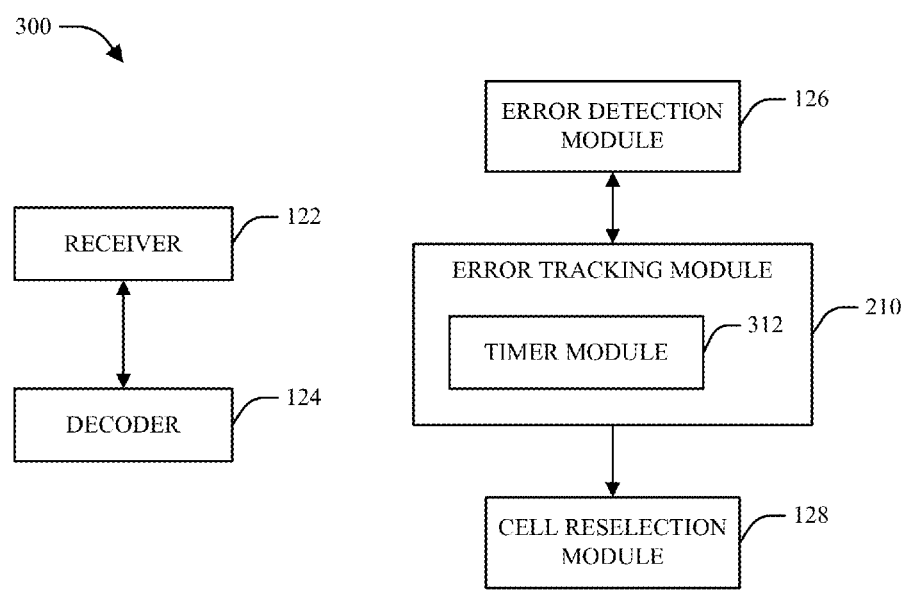

Turning next to FIG. 2-3, respective systems 200-300 are illustrated that facilitate tracking message errors in connection with respective cell avoidance and/or reselection procedures in accordance with various aspects described herein. Turning first to FIG. 2, a system 200 for tracking message errors can include a receiver 122 and decoder 124, which can be utilized to process incoming messages (e.g., messages received from a network cell 110 on a common channel) as generally described above. Additionally, an error detection module 126 can be employed to detect errors associated with receipt and/or decoding of respective messages. As further shown in system 200, an error tracking module 210 can be utilized to track respective errors detected by error detection module 126, and a cell reselection module 128 can be utilized to initiate one or more cell reselection procedures associated with barred cells based on the operation of error tracking module 210.

In accordance with one aspect, error tracking module 210 in system 200 can include an error counter 212, which can be utilized to maintain a count of erroneous messages encountered during attempted receipt and/or decoding of respected messages via receiver 122 and decoder 124, respectively. In one example, cell reselection module 128 can leverage error counter 212 in determining whether to consider a network cell as barred in various manners. By way of example, cell reselection module 128 can initiate an avoidance procedure associated with barred network cells with respect to a designated network cell upon determining that a sufficient number of unsuccessfully received and/or undecodable messages have been encountered (e.g., such that a count maintained by error counter 212 exceeds a predetermined threshold).

In accordance with another aspect, error counter 212 can maintain an error count in various manners. For example, a count maintained by error counter 212 can be a count of consecutive erroneous messages encountered during attempted decoding of respective messages. Additionally or alternatively, a count maintained by error counter 212 can be a count of erroneous messages encountered within a predefined time period or window during attempted decoding of respective messages. Further, error tracking module 210, error counter 212, and/or cell reselection module 128 can define a threshold number of errors (e.g., n) that can serve as a basis on which a network cell is considered barred according to various factors. By way of specific, non-limiting example, threshold n can be set on a case-by-case basis according to a tradeoff between a desired level of aggressiveness to be utilized in error handling and a probability of unwarranted cell barring (e.g., in the case of erroneous messages caused by interference, temporary air interface conditions, or the like). It should be appreciated, however, that an error count as described above can be maintained and/or utilized in any suitable manner.

Referring now to FIG. 3, another system 300 for tracking message errors can include a receiver 122 and decoder 124, which can interact with an error detection module 126, an error tracking module 210, and/or a cell reselection module 128 in a similar manner to system 200 in FIG. 2. In accordance with one aspect, error tracking module 210 in system 300 can include a timer module 312, which can coordinate one or more time measurements associated with errors encountered by receiver 122 and/or decoder 124. Respective time measurements coordinated by timer module 312 can, in turn, serve as a basis for determinations by cell reselection module 128.

By way of example, timer module 312 can track elapsed time between respective erroneous messages encountered during attempted receipt and/or decoding of respective messages by receiver 122 or decoder 124, respectively. Subsequently, cell reselection module 128 can initiate an avoidance procedure associated with barred network cells with respect to a designated network cell upon determining that the elapsed time between respective erroneous messages encountered during the attempted receipt and/or decoding is less than a predetermined threshold.

With regard to the above example, respective messages for which elapsed time is tracked by timer module 312 can be consecutive and/or nonconsecutive messages. Thus, for example, timer module 312 can measure elapsed time between consecutive erroneous messages, determine whether a predefined number of (consecutive or nonconsecutive) erroneous messages are detected within a predefined time period, and/or track time measurements associated with respective messages in any other suitable manner.

Figure 4:
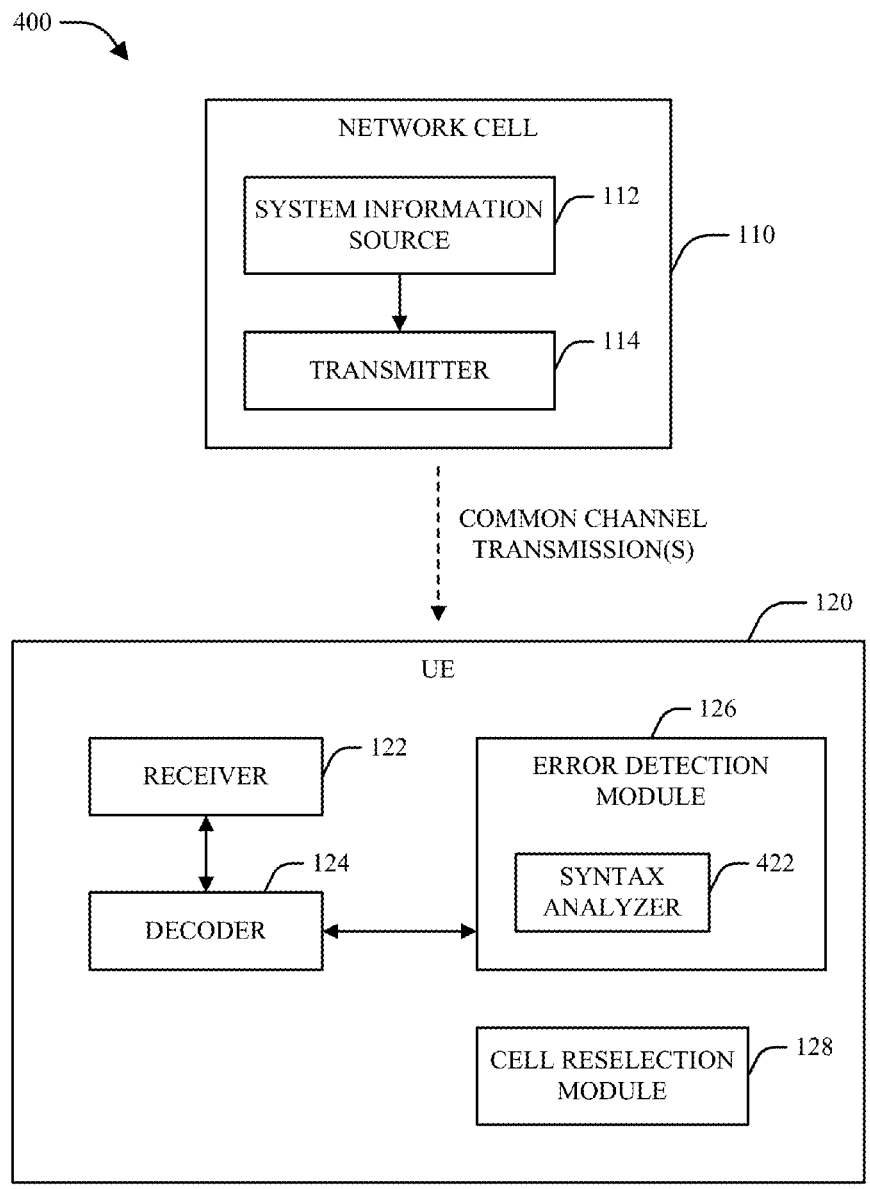
FIG. 4 is a block diagram of a system for detecting and processing abstract syntax errors associated with respective messages received within a wireless communication system in accordance with various aspects.

Referring next to FIG. 4, a block diagram of a system 400 for detecting and processing abstract syntax errors associated with respective messages received within a wireless communication system in accordance with various aspects is illustrated. As illustrated in FIG. 4, system 400 can include a network cell 110, which can utilize a system information source 112, a transmitter 114, and/or other means for transmitting information to a UE 120 on one or more common channels as described above with respect to system 100. As system 400 further illustrates, UE 120 can include a receiver 122 and decoder 124 for processing incoming common messages from network cell 110. An error detection module 126 can be utilized by UE 120 to detect errors associated with decoding of respective messages, based on which a cell reselection module 128 can initiate selection of a new network cells (e.g., as if network cell 110 was barred) under predetermined circumstances.

In accordance with one aspect, error detection module 126 can leverage a syntax analyzer 422 or other means to track respective messages within one or more messages received by UE 120 for which an associated abstract syntax is invalid. For example, syntax analyzer 422 can be utilized to track respective errors associated with messages that are undecodable by decoder 124 due to invalid abstract syntax (e.g., invalid Abstract Syntax Notation 1 (ASN.1) encoding on a common channel from network cell 110) for purposes of potential cell reselection.

Conventionally, when UE 120 receives an RRC message or other message on a common communication channel (e.g., BCCH, PCCH, CCCH, etc.) for which the abstract syntax is invalid, UE 120 can be configured to ignore the message. However, it can be appreciated that invalid messages communicated by network cell 110 on a common channel can in some cases be indicative of errors associated with network cell 110 for which it would be desirable for UE 120 to search for a new network cell. Accordingly, syntax analyzer 422 can be configured to trigger operation of cell reselection module 128 in some cases. For example, if UE 120 receives more than n consecutive RRC messages and/or other messages from network cell 110 on the CCCH (and/or other suitable common channel) for which the abstract syntax is invalid, cell reselection module 128 can be utilized to consider network cell 110 to be barred in accordance with respective cell avoidance procedures. As used above, n can be any integer as determined by UE implementation and/or other factors. In addition, while the above example is given in terms of consecutive erroneous messages, it should be appreciated that triggering of cell reselection module 128 could occur in any suitable manner (e.g., any manner described above with respect to system 200 or system 300, and/or any other suitable manner).

Figure 5:
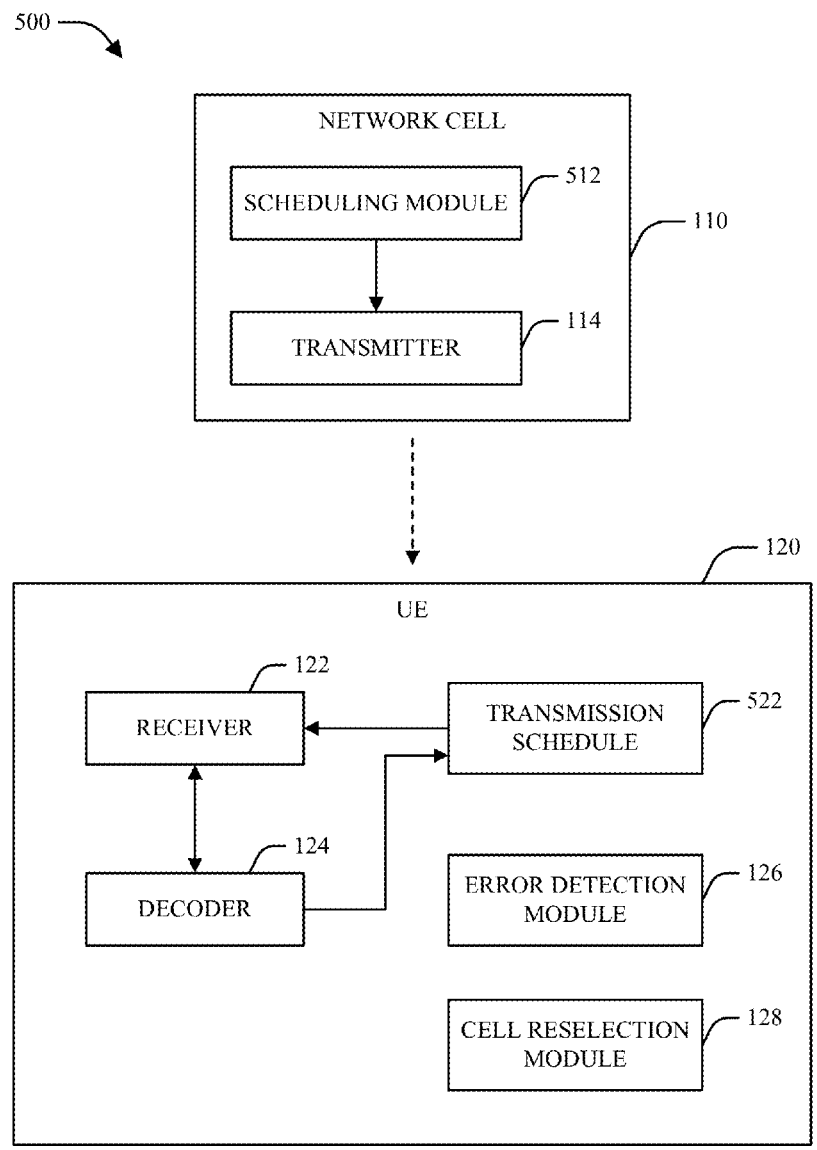
FIG. 5 is a block diagram of a system for detecting and processing errors associated with respective scheduled transmissions within a wireless communication system in accordance with various aspects.

Turning now to FIG. 5, a block diagram of a system 500 for detecting and processing errors associated with respective scheduled transmissions within a wireless communication system in accordance with various aspects is illustrated. As illustrated in FIG. 5, system 500 can include a network cell 110, which can utilize a scheduling module 512 and a transmitter 114 to conduct respective scheduled transmissions to a UE 120. As system 500 further illustrates, UE 120 can leverage information relating to a transmission schedule 522 and/or other scheduling information relating to network cell 110, based on which a receiver 122 and decoder 124 can be utilized for processing incoming messages from network cell 110. In a similar manner to system 100 and system 400, an error detection module 126 can be utilized by UE 120 to detect errors associated with decoding of respective messages, based on which a cell reselection module 128 can initiate selection of a new network cell (e.g., as if network cell 110 was barred) under predetermined circumstances.

In accordance with one aspect, UE 120 can be configured to obtain one or more scheduling messages from network cell 110 that indicate presence of one or more subsequent system information messages. In one example, such scheduling messages and/or other suitable information can be incorporated into transmission schedule 522. Subsequently, UE 120 can attempt to acquire the one or more subsequent system information messages based on the scheduling message(s) received previously. Upon an unsuccessful attempt to acquire the one or more subsequent system information messages (e.g., as determined by error detection module 126), cell reselection module 128 can initiate an avoidance procedure associated with barred network cells with respect to network cell 110. In accordance with another aspect, an unsuccessful attempt to acquire system information messages can occur in various manners. For example, an unsuccessful attempt to acquire one or more subsequent system information messages can correspond to a failure of network cell 110 to transmit the subsequent system information message(s). Additionally or alternatively, an unsuccessful attempt to acquire one or more subsequent system information messages can correspond to a failure to receive the subsequent system information message(s), a failure to decode the subsequent system information message(s), and/or any other detected failure event.

In one example, system 500 can be utilized in the event that a scheduling block for information messages is received and decoded correctly and indicates the presence of further system information that is not receivable or decodable by UE 120. In such a case, UE 120 can be configured to utilize similar error handling techniques to those employed upon detecting missing critical system information. For example, if UE 120 is operating in idle mode or in connected mode during connection reestablishment, and network cell 110 does not transmit (or UE 120 assumes it is unable to acquire) a MIB, a SystemInformationBlockType1 (SIB1), or a SystemInformationBlockType2 (SIB2), UE 120 can consider network cell 110 to be barred in association with various error handling procedures. Thus, in accordance with one aspect, UE 120 can extend this cell barring technique in the case of scheduled information as described above. For example, if network cell 110 does not transmit, or UE 120 assumes it is unable to acquire, any other system information blocks whose presence is indicated in the scheduling information in SIB1 and/or any other suitable scheduling information, UE 120 can consider the cell to be barred in association with various error handling procedures.

Figure 6:
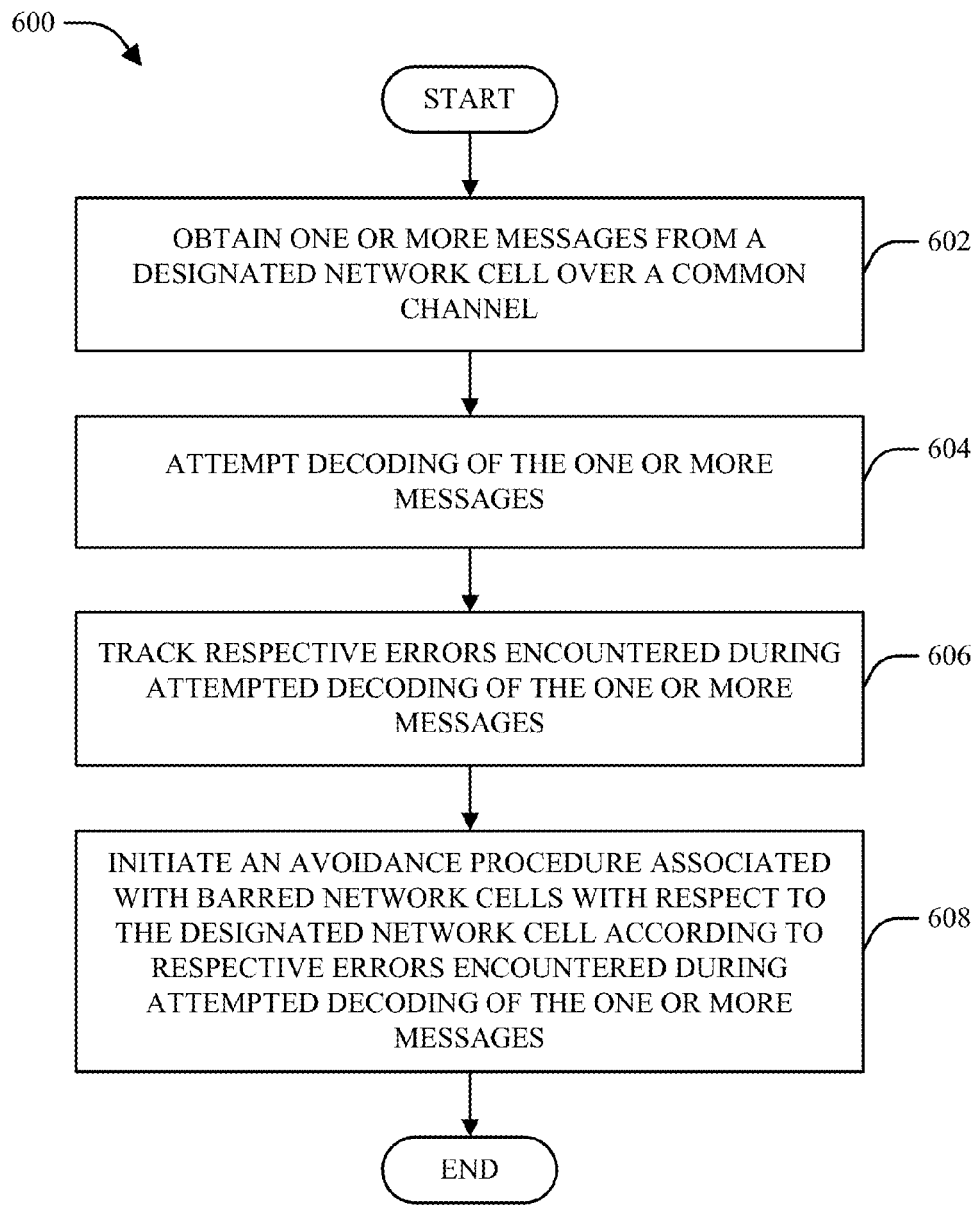
FIGS. 6-8 are flow diagrams of respective methodologies for conducting cell barring procedures in response to erroneous messages received from a designated network cell in a wireless communication system.
Figure 7:
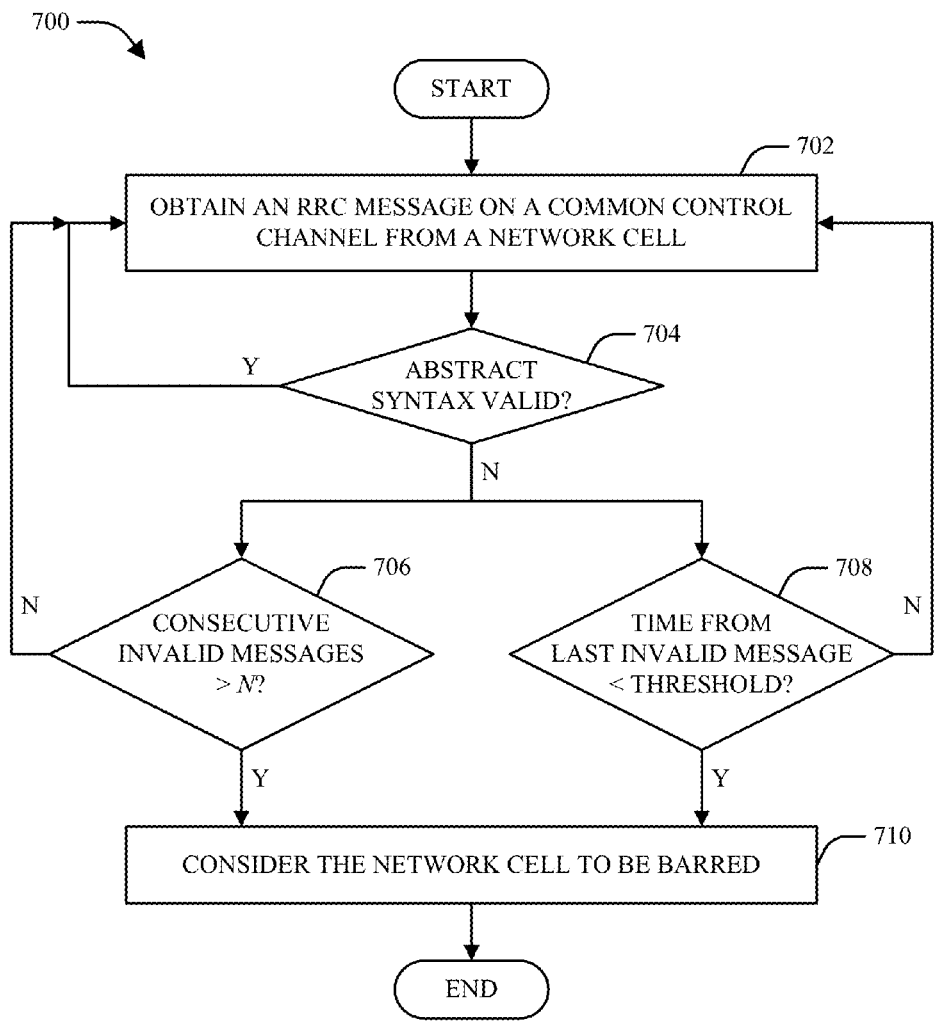
Figure 8:
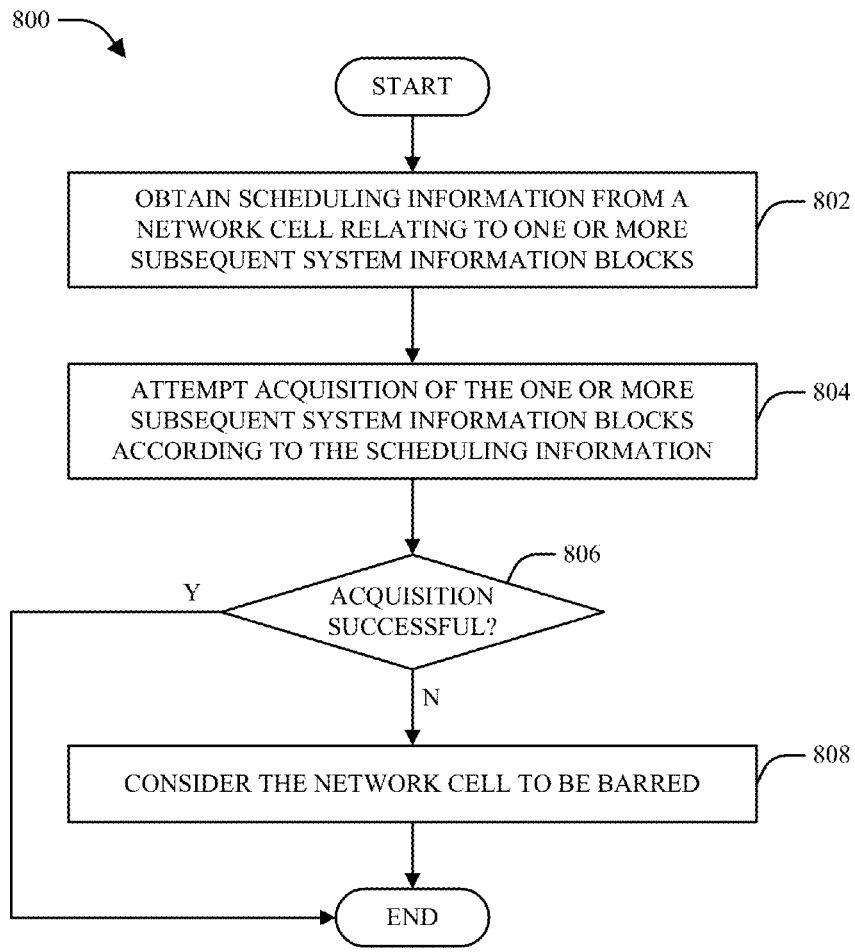

Referring now to FIGS. 6-8, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 6, illustrated is a methodology 600 for conducting cell barring procedures in response to erroneous messages received from a designated network cell in a wireless communication system. It is to be appreciated that methodology 600 can be performed by, for example, a UE (e.g., UE 120) and/or any other appropriate network entity. Methodology 600 begins at block 602, wherein one or more messages are obtained (e.g., via a receiver 122) from a designated network cell (e.g., network cell 110) over a common channel. Next, at block 604, decoding of the one or more messages is attempted (e.g., by a decoder 124). At block 606, respective errors encountered during attempted decoding of the one or more messages are tracked (e.g., by an error detection module 126 and/or an error tracking module 210). Methodology 600 can then conclude at block 608, wherein an avoidance procedure associated with barred network cells is initiated (e.g., by cell reselection module 128) with respect to the designated network cell from which messages are obtained at block 602 according to respective errors encountered during attempted decoding of the one or more messages as tracked at block 606.

Turning now to FIG. 7, a flow diagram of another methodology 700 for conducting cell barring on erroneous messages is illustrated. Methodology 700 can be performed by a mobile user device and/or any other appropriate network entity. Methodology 700 begins at block 702, wherein an RRC message is received on a common control channel from a network cell. Next, at block 704, it is determined (e.g., by a syntax analyzer 422) whether an abstract syntax associated with the RRC message received at block 702 is valid. If the abstract syntax of the message is valid, methodology 700 can return to block 702 for processing of a new message. Otherwise, methodology 700 can proceed to block 706 and/or block 708.

At block 706, it is determined whether a count of consecutive messages with invalid syntax (e.g., as maintained by error counter 212) exceeds a threshold N. If the count exceeds N, methodology concludes at block 710, wherein the network cell from which the RRC message was received at block 702 is barred. Otherwise, methodology 700 can return to block 702 to process further RRC messages. Similarly, at block 708, it is determined whether an elapsed time from a last message having invalid syntax (e.g., as maintained by timer module 312) is less than a predefined threshold. If the elapsed time is less than the threshold, methodology 700 can conclude at block 710 as described above. Otherwise, methodology 700 can return to block 702 for processing of further RRC messages.

FIG. 8 illustrates a third methodology 800 for performing cell barring on erroneous messages. Methodology 800 can be performed by, for example, a mobile terminal and/or any other suitable network entity. Methodology 800 begins at block 802, wherein scheduling information (e.g., transmission schedule 522) is obtained from a network cell that relates to one or more subsequent system information blocks. Next, at block 804, acquisition of the one or more subsequent system information blocks that correspond to the scheduling information obtained at block 802 is attempted according to the obtained scheduling information. At block 806, it is then determined whether acquisition as performed at block 804 was successful. If acquisition was successful, methodology 800 can conclude. Otherwise, methodology 800 can proceed to block 808 before concluding, wherein the network cell from which the scheduling information was received at block 802 is considered to be barred.

Figure 9:
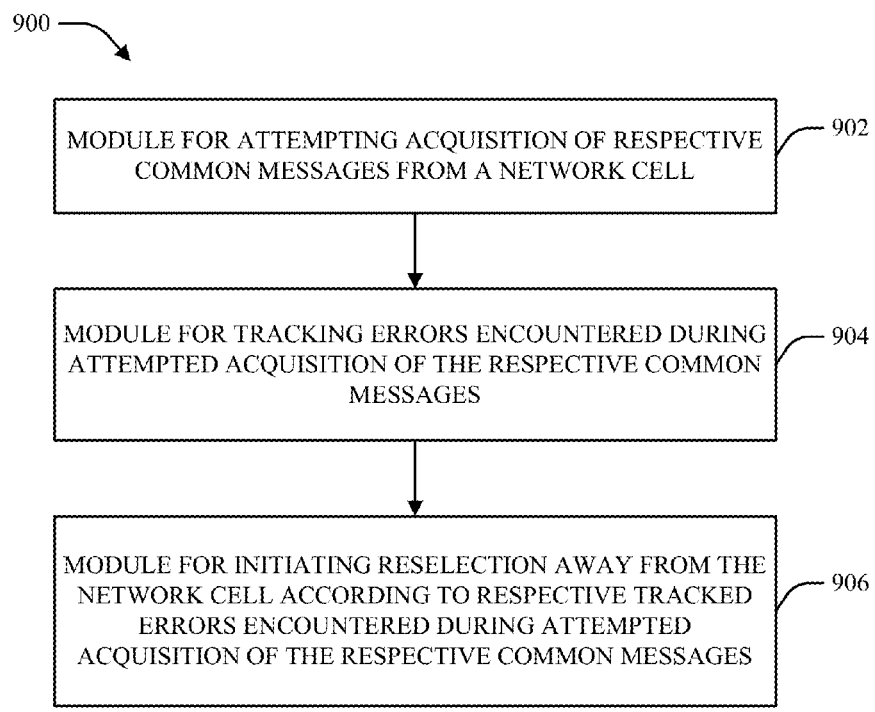
FIG. 9 is a block diagram of an apparatus that facilitates signaling error management within a wireless communication system.

Referring next to FIG. 9, an apparatus 900 that facilitates signaling error management within a wireless communication system is illustrated. It is to be appreciated that apparatus 900 is represented as including functional blocks, which can be functional blocks that represent functions implemented by a processor, software, or combination thereof (e.g., firmware). Apparatus 900 can be implemented by a UE (e.g., UE 120) and/or any other suitable network entity and can include a module 902 for attempting acquisition of respective common messages from a network cell, a module 904 for tracking errors encountered during attempted acquisition of the respective common messages, and a module 906 for initiating reselection away from the network cell according to respective tracked errors encountered during attempted acquisition of the respective common messages.

Figure 10:
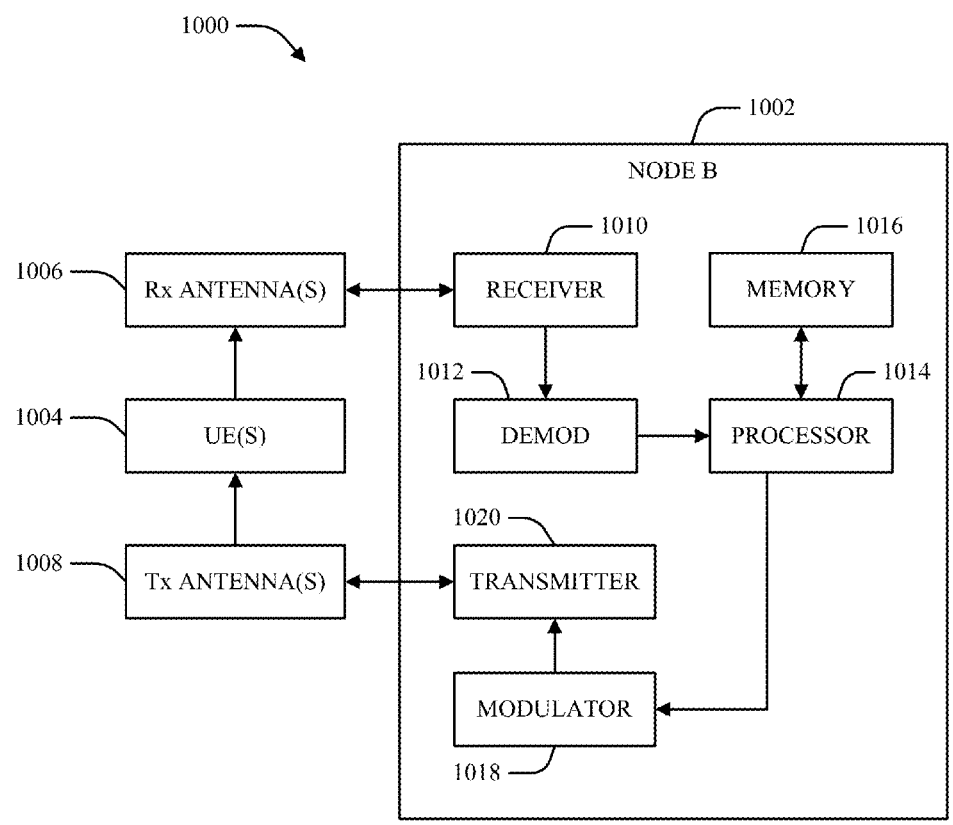
FIGS. 10-11 are block diagrams of respective wireless communication devices that can be utilized to implement various aspects described herein.

FIG. 10 is a block diagram of a system 1000 that can be utilized to implement various aspects of the functionality described herein. In one example, system 1000 includes a base station or Node B 1002. As illustrated, Node B 1002 can receive signal(s) from one or more UEs 1004 via one or more receive (Rx) antennas 1006 and transmit to the one or more UEs 1004 via one or more transmit (Tx) antennas 1008. Additionally, Node B 1002 can comprise a receiver 1010 that receives information from receive antenna(s) 1006. In one example, the receiver 1010 can be operatively associated with a demodulator (Demod) 1012 that demodulates received information. Demodulated symbols can then be analyzed by a processor 1014. Processor 1014 can be coupled to memory 1016, which can store information related to code clusters, access terminal assignments, lookup tables related thereto, unique scrambling sequences, and/or other suitable types of information. In one example, Node B 1002 can also include a modulator 1018 that can multiplex a signal for transmission by a transmitter 1020 through transmit antenna(s) 1008.

Figure 11:
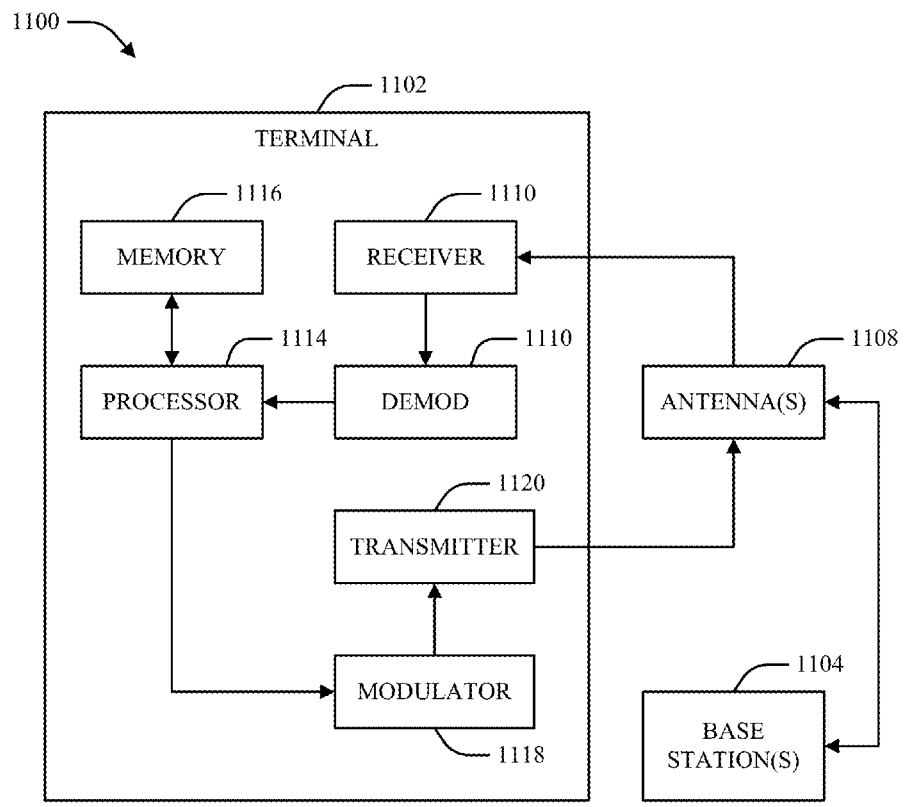

FIG. 11 is a block diagram of another system 1100 that can be utilized to implement various aspects of the functionality described herein. In one example, system 1100 includes a mobile terminal 1102. As illustrated, mobile terminal 1102 can receive signal(s) from one or more base stations 1104 and transmit to the one or more base stations 1104 via one or more antennas 1108. Additionally, mobile terminal 1102 can comprise a receiver 1110 that receives information from antenna(s) 1108. In one example, receiver 1110 can be operatively associated with a demodulator (Demod) 1112 that demodulates received information. Demodulated symbols can then be analyzed by a processor 1114. Processor 1114 can be coupled to memory 1116, which can store data and/or program codes related to mobile terminal 1102. Additionally, mobile terminal 1102 can employ processor 1114 to perform methodologies 600-800 and/or other similar and appropriate methodologies. Mobile terminal 1102 can also include a modulator 1118 that can multiplex a signal for transmission by a transmitter 1120 through antenna(s) 1108.

Figure 12:
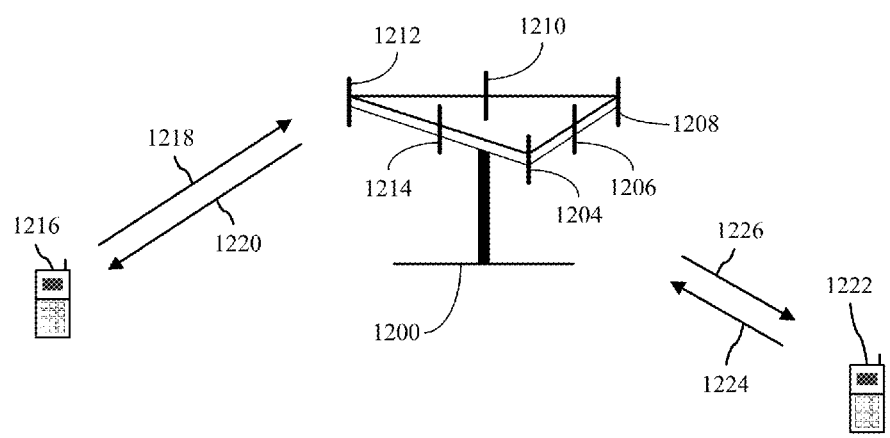
FIG. 12 illustrates a wireless multiple-access communication system in accordance with various aspects set forth herein.

Referring now to FIG. 12, an illustration of a wireless multiple-access communication system is provided in accordance with various aspects. In one example, an access point 1200 (AP) includes multiple antenna groups. As illustrated in FIG. 12, one antenna group can include antennas 1204 and 1206, another can include antennas 1208 and 1210, and another can include antennas 1212 and 1214. While only two antennas are shown in FIG. 12 for each antenna group, it should be appreciated that more or fewer antennas may be utilized for each antenna group. In another example, an access terminal 1216 can be in communication with antennas 1212 and 1214, where antennas 1212 and 1214 transmit information to access terminal 1216 over forward link 1220 and receive information from access terminal 1216 over reverse link 1218. Additionally and/or alternatively, access terminal 1222 can be in communication with antennas 1206 and 1208, where antennas 1206 and 1208 transmit information to access terminal 1222 over forward link 1226 and receive information from access terminal 1222 over reverse link 1224. In a frequency division duplex system, communication links 1218, 1220, 1224 and 1226 can use different frequency for communication. For example, forward link 1220 may use a different frequency then that used by reverse link 1218.

Each group of antennas and/or the area in which they are designed to communicate can be referred to as a sector of the access point. In accordance with one aspect, antenna groups can be designed to communicate to access terminals in a sector of areas covered by access point 1200. In communication over forward links 1220 and 1226, the transmitting antennas of access point 1200 can utilize beamforming in order to improve the signal-to-noise ratio of forward links for the different access terminals 1216 and 1222. Also, an access point using beamforming to transmit to access terminals scattered randomly through its coverage causes less interference to access terminals in neighboring cells than an access point transmitting through a single antenna to all its access terminals.

An access point, e.g., access point 1200, can be a fixed station used for communicating with terminals and can also be referred to as a base station, an eNB, an access network, and/or other suitable terminology. In addition, an access terminal, e.g., an access terminal 1216 or 1222, can also be referred to as a mobile terminal, user equipment, a wireless communication device, a terminal, a wireless terminal, and/or other appropriate terminology.

Figure 13:
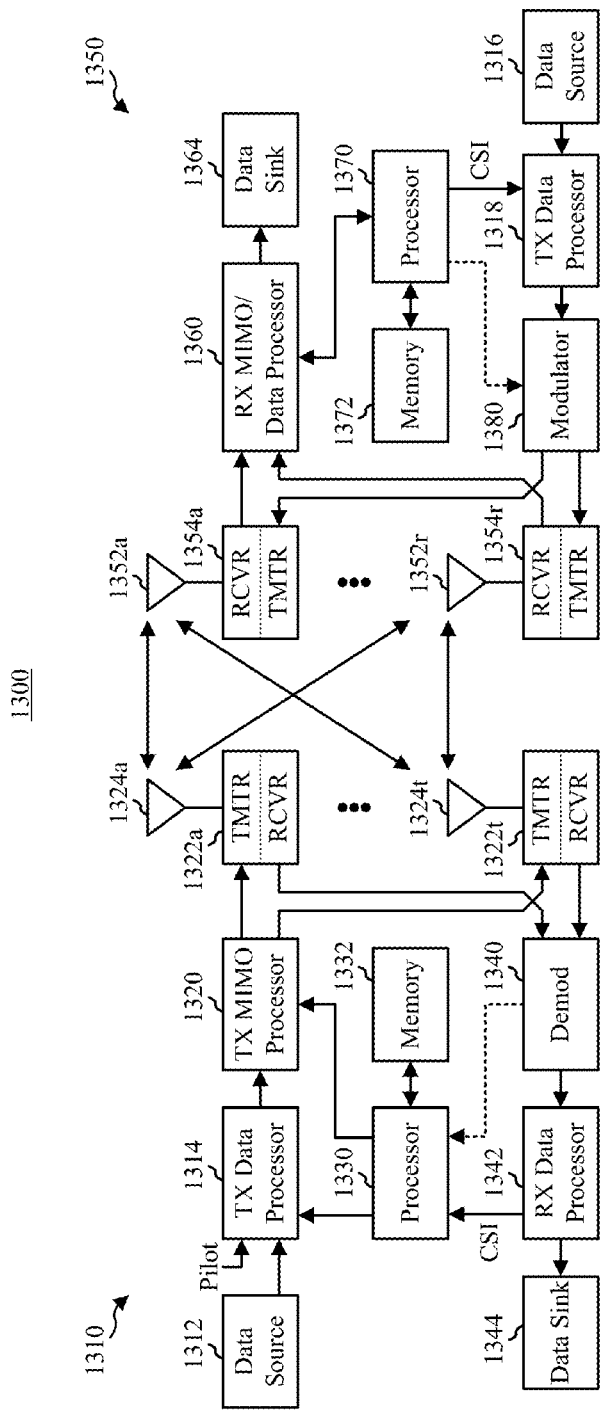
FIG. 13 is a block diagram illustrating an example wireless communication system in which various aspects described herein can function.

Referring now to FIG. 13, a block diagram illustrating an example wireless communication system 1300 in which various aspects described herein can function is provided. In one example, system 1300 is a multiple-input multiple-output (MIMO) system that includes a transmitter system 1310 and a receiver system 1350. It should be appreciated, however, that transmitter system 1310 and/or receiver system 1350 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1310 and/or receiver system 1350 described herein could be utilized in connection with a single output to single input antenna system.

In accordance with one aspect, traffic data for a number of data streams are provided at transmitter system 1310 from a data source 1312 to a transmit (TX) data processor 1314. In one example, each data stream can then be transmitted via a respective transmit antenna 1324. Additionally, TX data processor 1314 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1350 to estimate channel response. Back at transmitter system 1310, the multiplexed pilot and coded data for each data stream can be modulated (e.g., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1330.

Next, modulation symbols for all data streams can be provided to a TX MIMO processor 1320, which can further process the modulation symbols (e.g., for OFDM). TX MIMO processor 1320 can then provides $N_T$ modulation symbol streams to $N_T$ transceivers 1322*a* through 1322*t*. In one example, each transceiver 1322 can receive and process a respective symbol stream to provide one or more analog signals. Each transceiver 1322 can then further condition (e.g., amplify, filter, and upconvert) the analog signals to provide a modulated signal suitable for transmission over a MIMO channel. Accordingly, $N_T$ modulated signals from transceivers 1322*a* through 1322*t* can then be transmitted from $N_T$ antennas 1324*a* through 1324*t*, respectively.

In accordance with another aspect, the transmitted modulated signals can be received at receiver system 1350 by $N_R$ antennas 1352*a* through 1352*r*. The received signal from each antenna 1352 can then be provided to respective transceivers 1354. In one example, each transceiver 1354 can condition (e.g., filter, amplify, and downconvert) a respective received signal, digitize the conditioned signal to provide samples, and then processes the samples to provide a corresponding "received" symbol stream. An RX MIMO/data processor 1360 can then receive and process the $N_R$ received symbol streams from $N_R$ transceivers 1354 based on a particular receiver processing technique to provide $N_T$ "detected" symbol streams. In one example, each detected symbol stream can include symbols that are estimates of the modulation symbols transmitted for the corresponding data stream. RX processor 1360 can then process each symbol stream at least in part by demodulating, deinterleaving, and decoding each detected symbol stream to recover traffic data for a corresponding data stream. Thus, the processing by RX processor 1360 can be complementary to that performed by TX MIMO processor 1320 and TX data processor 1314 at transmitter system 1310. RX processor 1360 can additionally provide processed symbol streams to a data sink 1364.

In accordance with one aspect, the channel response estimate generated by RX processor 1360 can be used to perform space/time processing at the receiver, adjust power levels, change modulation rates or schemes, and/or other appropriate actions. Additionally, RX processor 1360 can further estimate channel characteristics such as, for example, signal-to-noise-and-interference ratios (SNRs) of the detected symbol streams. RX processor 1360 can then provide estimated channel characteristics to a processor 1370. In one example, RX processor 1360 and/or processor 1370 can further derive an estimate of the "operating" SNR for the system. Processor 1370 can then provide channel state information (CSI), which can comprise information regarding the communication link and/or the received data stream. This information can include, for example, the operating SNR. The CSI can then be processed by a TX data processor 1318, modulated by a modulator 1380, conditioned by transceivers 1354a through 1354r, and transmitted back to transmitter system 1310. In addition, a data source 1316 at receiver system 1350 can provide additional data to be processed by TX data processor 1318.

Back at transmitter system 1310, the modulated signals from receiver system 1350 can then be received by antennas 1324, conditioned by transceivers 1322, demodulated by a demodulator 1340, and processed by a RX data processor 1342 to recover the CSI reported by receiver system 1350. In one example, the reported CSI can then be provided to processor 1330 and used to determine data rates as well as coding and modulation schemes to be used for one or more data streams. The determined coding and modulation schemes can then be provided to transceivers 1322 for quantization and/or use in later transmissions to receiver system 1350. Additionally and/or alternatively, the reported CSI can be used by processor 1330 to generate various controls for TX data processor 1314 and TX MIMO processor 1320. In another example, CSI and/or other information processed by RX data processor 1342 can be provided to a data sink 1344.

In one example, processor 1330 at transmitter system 1310 and processor 1370 at receiver system 1350 direct operation at their respective systems. Additionally, memory 1332 at transmitter system 1310 and memory 1372 at receiver system 1350 can provide storage for program codes and data used by processors 1330 and 1370, respectively. Further, at receiver system 1350, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
    obtaining one or more messages from a designated network cell over a common channel;
    attempting decoding of the one or more messages;
    tracking respective errors encountered during the attempted decoding of the one or more messages, wherein the tracking comprises maintaining a count of erroneous messages encountered during the attempted decoding of the one or more messages; and
    initiating an avoidance procedure associated with barred network cells with respect to the designated network cell according to respective tracked errors associated with the attempted decoding of the one or more messages, wherein the initiating comprises initiating the avoidance procedure associated with barred network cells with respect to the designated network cell upon determining that the count exceeds a predetermined threshold.

2. The method of claim 1, wherein the common channel is a Common Control Channel (CCCH).

3. The method of claim 1, wherein the one or more messages comprise Radio Resource Control (RRC) messages.

4. The method of claim 1, wherein the tracking comprises tracking respective messages in the one or more messages for which an associated abstract syntax is invalid.

5. The method of claim 1, wherein the count is a count of consecutive erroneous messages encountered during the attempted decoding of the one or more messages.

6. The method of claim 1, wherein the count is a count of erroneous messages encountered within a predefined time window during the attempted decoding of the one or more messages.

7. The method of claim 1, wherein the initiating comprises initiating selection of a network cell disparate from the designated network cell at a frequency band disparate from a frequency band associated with the designated network cell.

8. A wireless communications apparatus, comprising:
    a memory that stores data relating to a designated network cell and a common communication channel associated with the designated network cell; and
    a processor configured to
        obtain one or more messages from the designated network cell over the common communication channel,
        attempt decoding of the one or more messages,
        track respective errors encountered during attempted decoding of the one or more messages, including maintain a count of erroneous messages encountered during attempted decoding of the one or more messages, and
        initiate an avoidance procedure associated with barred network cells with respect to the designated network cell according to respective tracked errors encountered during the attempted decoding of the one or more messages, including initiate the avoidance procedure associated with barred network cells with respect to the designated network cell upon determining that the count exceeds a predetermined threshold.

9. The wireless communications apparatus of claim 8, wherein the common communication channel is a Common Control Channel (CCCH).

10. The wireless communications apparatus of claim 8, wherein the processor is further configured to track respective errors encountered during attempted decoding of the one or more messages at least in part by tracking respective messages in the one or more messages for which an associated abstract syntax is invalid.

11. The wireless communications apparatus of claim 8, wherein the count is a count of consecutive erroneous messages encountered during the attempted decoding of the one or more messages.

12. The wireless communications apparatus of claim 8, wherein the count is a count of erroneous messages encountered within a predefined time window during the attempted decoding of the one or more messages.

13. The wireless communications apparatus of claim 8, wherein the avoidance procedure associated with barred network cells comprises selection of a network cell disparate from the designated network cell at a frequency band disparate from a frequency band associated with the designated network cell.

14. An apparatus, comprising:
  means for attempting acquisition of respective common messages from a network cell;
  means for tracking errors encountered during attempted acquisition of the respective common messages, wherein the means for tracking comprises means for maintaining a count of erroneous messages encountered during attempted acquisition of the respective common messages; and
  means for initiating reselection away from the network cell according to respective tracked errors encountered during attempted acquisition of the respective common messages, wherein the means for initiating reselection comprises means for initiating reselection away from the network cell upon determining that the count exceeds a predetermined threshold.

15. The apparatus of claim 14, wherein the respective common messages are associated with a Common Control Channel (CCCH).

16. The apparatus of claim 14, wherein the means for tracking comprises means for tracking respective common messages for which an associated abstract syntax is invalid.

17. The apparatus of claim 14, wherein the count comprises a count of consecutive erroneous messages encountered during attempted acquisition of the respective common messages.

18. The apparatus of claim 14, wherein the count comprises a count of erroneous messages encountered within a predefined time period during attempted acquisition of the respective common messages.

19. The apparatus of claim 14, wherein the means for initiating reselection comprises means for initiating reselection away from the network cell at a frequency band disparate from a frequency band associated with the network cell.

20. A computer program product, comprising:
  a non-transitory computer-readable medium, comprising:
    code for causing a computer to attempt acquisition of respective common messages from a network cell;
    code for causing a computer to track errors encountered during attempted acquisition of the respective common messages, wherein the code for causing a computer to track comprises code for causing a computer to maintain a count of erroneous messages encountered during attempted acquisition of the respective common messages; and
    code for causing a computer to initiate reselection away from the network cell according to respective tracked errors encountered during attempted acquisition of the respective common messages, wherein the code for causing a computer to initiate reselection comprises code for causing a computer to initiate reselection away from the network cell upon determining that the count exceeds a predetermined threshold.

21. The computer program product of claim 20, wherein the respective common messages are associated with a Common Control Channel (CCCH).

22. The computer program product of claim 20, wherein the code for causing a computer to track comprises code for causing a computer to track respective common messages for which an associated abstract syntax is invalid.

23. The computer program product of claim 20, wherein the count comprises a count of consecutive erroneous messages encountered during attempted acquisition of the respective common messages.

24. The computer program product of claim 20, wherein the count comprises a count of erroneous messages encountered within a predefined time period during attempted acquisition of the respective common messages.

25. The computer program product of claim 20, wherein the code for causing a computer to initiate reselection comprises code for causing a computer to initiate reselection away from the network cell at a frequency band disparate from a frequency band associated with the network cell.

* * * * *